United States Patent [19]

Kato et al.

[11] Patent Number: 4,864,135

[45] Date of Patent: Sep. 5, 1989

[54] RADIATION IMAGE READ-OUT AND REPRODUCING APPARATUS

[75] Inventors: Hisatoyo Kato; Toshitaka Agano, both of Kanagawa, Japan

[73] Assignee: Fuji Photo Film Co., Ltd., Kanagawa, Japan

[21] Appl. No.: 254,639

[22] Filed: Oct. 7, 1988

[30] Foreign Application Priority Data

Oct. 7, 1987 [JP] Japan .................................. 62-252959

[51] Int. Cl.$^4$ ........................................... G01N 23/04
[52] U.S. Cl. .................................................. 250/327.2
[58] Field of Search ........................... 250/489.1, 327.2

[56] References Cited

U.S. PATENT DOCUMENTS 4,723,151 2/1988 Sonezaki et al. ..................... 355/27

Primary Examiner—Carolyn E. Fields
Attorney, Agent, or Firm—Sughrue, Mion, Zinn, MacPeak & Seas

[57] ABSTRACT

A radiation image read-out and reproducing apparatus comprises a section for feeding a stimulable phosphor sheet carrying a radiation image stored thereon, a section for feeding a developed film carrying a radiation image recorded thereon, a section for feeding a recording sheet, a light beam scanning section, and conveyance systems for conveying the stimulable phosphor sheet, the film and the recording sheet respectively to the light beam scanning section and then out of the light beam scanning section. The light beam scanning section detects the radiation image by scanning the stimulable phosphor sheet or the film, and reproduces the detected radiation image as a visible image on the recording sheet.

13 Claims, 3 Drawing Sheets

RADIATION IMAGE READ-OUT AND REPRODUCING APPARATUS

BACKGROUND OF THE INVENTION

1. Field of the Invention

This invention relates to a radiation image readout and reproducing apparatus for use in a radiation image recording and reproducing system, wherein read-out and reproduction of a radiation image are carried out by use of the same scanning system in the same apparatus.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased for reusing the stimulable phosphor sheet.

In recent years, various attempts have been made to make small the aforesaid radiation image recording and reproducing system as a whole and to reduce the manufacture cost of the system. As one of such attempts, the applicant proposed in Japanese Patent Application No. 62(1987)-5263 a radiation image read-out and reproducing apparatus wherein read-out and reproduction of an image stored on a stimulable phosphor sheet are carried out by use of the same subscanning system in the same apparatus, and wherein the apparatus as a whole is made small and the manufacture cost thereof is reduced by integrally combining a read-out apparatus with a reproducing apparatus which have heretofore been provided independently.

In the case where the read-out apparatus and the reproducing apparatus are combined integrally such that a single sub-scanning means is used for both the image read-out and the image reproduction, the generation of the image signals by the read-out from the stimulable phosphor sheet and the reproduction of the radiation image of an object by use of the image signals can be carried out with a single apparatus. On the other hand, the conventional system for obtaining an X-ray image of an object by use of an X-ray film is still used frequently. Also, even though the conventional system using the X-ray film is replaced by the radiation image recording and reproducing system using the stimulable phosphor sheet, a large number of the X-ray films on which an X-ray image was recorded in the past have heretofore been stored and should still be processed. Furthermore, diagnostic apparatuses such as a CT and a US are often used in recent years, and a large number of films on which an image generated by these diagnostic apparatuses is recorded should be processed. Therefore, it is desired that the image recorded on each of these films be read out photoelectrically, and the image signals thus obtained be image-processed in the same manner as the image signals detected from the stimulable phosphor sheet, stored and used for the image reproduction.

For the aforesaid purposes, it has heretofore been necessary to use a film read-out apparatus for photoelectrically detecting the image recorded on the film independent of the radiation image recording and reproducing system using the stimulable phosphor sheet. Therefore, even though only the radiation image recording and reproducing system using the stimulable phosphor sheet is improved and made small, the overall system including the function of the image read-out from the film could not be made so small and the manufacture cost thereof could not be reduced so much.

SUMMARY OF THE INVENTION

The primary object of the present invention is to provide a radiation image read-out and reproducing apparatus wherein a read-out apparatus for obtaining image signals by reading out an image stored on a stimulable phosphor sheet, a reproducing apparatus for reproducing a visible image by use of the image signals thus obtained, and a film read-out apparatus for reading out an image recorded on a film are combined integrally with one another, thereby to enable reproduction of a visible image by use of image signals generated by the film read-out apparatus.

Another object of the present invention is to provide a radiation image read-out and reproducing apparatus which enables reduction of the size of the overall system including the function of read-out of an image recorded on a film, and reduction of the manufacture cost of the overall system.

The present invention provides a first radiation image read-out and reproducing apparatus comprising:

(i) a stimulable phosphor sheet feeding section for housing a stimulable phosphor sheet carrying a radiation image stored thereon, and feeding out said housed stimulable phosphor sheet, (ii) a film feeding section for feeding a developed film carrying a radiation image recorded thereon, (iii) a recording sheet feeding section for housing recording sheets and feeding out said housed recording sheets one by one, (iv) a light beam scanning section provided with:

(a) a read-out main scanning means for the stimulable phosphor sheet for deflecting a light beam by a light deflector and scanning said light beam in a main scanning direction on said stimulable phosphor sheet, (b) a read-out main scanning means for the film for deflecting a light beam by a light deflector and scanning said light beam in a main scanning direction on said film, (c) a reproducing main scanning means for deflecting a light beam by a light deflector and scanning said light beam in the main scanning direction on said recording sheet, (d) a sub-scanning means for scanning said stimulable phosphor sheet, said film and said recording sheet respectively in a sub-scanning direction by moving them in the sub-scanning direction approximately normal to said main scanning direction, (e) an emitted light detection means for detecting light which is emitted by a position on said stimulable phosphor sheet upon which the light beam is irradiated by said read-out main scanning means for the stimulable phosphor sheet and which carries the radiation image stored on said stimulable phosphor sheet, and (f) a light beam detection means for detecting the light beam irradiated by said read-out main scanning means for the film onto said film and intensity-modulated by the radiation image recorded on said film, wherein the radiation image is detected by said emitted light detection means or said light beam detection means by scanning said stimulable phosphor sheet or said film, and said radiation image thus detected is reproduced on said recording sheet by modulating the light beam in said reproducing main scanning means in accordance with said detected radiation image, (v) a stimulable phosphor sheet conveyance means for receiving said stimulable phosphor sheet fed out of said stimulable phosphor sheet feeding section, conveying said stimulable phosphor sheet to said light beam scanning section, and thereafter conveying said stimulable phosphor sheet out of said light beam scanning section, (vi) a film conveyance means for receiving said developed film fed out of said film feeding section, conveying said developed film to said light beam scanning section, and thereafter conveying said developed film out of said light beam scanning section, and (vii) a recording sheet conveyance means for receiving said recording sheet fed out of said recording sheet feeding section, conveying said recording sheet to said light beam scanning section, and thereafter conveying said recording sheet out of said light beam scanning section.

The recording sheet on which the radiation image has been reproduced at the light beam scanning section is ultimately sent to an automatic developing machine for developing the radiation image, and therefore the radiation image read-out and reproducing apparatus in accordance with the present invention may be provided with a mechanism for automatically carrying out development. Accordingly, the present invention also provides a second radiation image read-out and reproducing apparatus comprising the aforesaid stimulable phosphor sheet feeding section, the aforesaid film feeding section, the aforesaid recording sheet feeding section, the aforesaid light beam scanning section, the aforesaid stimulable phosphor sheet conveyance means, the aforesaid film conveyance means, an automatic developing section for carrying out development on said recording sheet carrying said radiation image reproduced thereon, and a recording sheet conveyance means for receiving said recording sheet fed out of said recording sheet feeding section, conveying said recording sheet to said light beam scanning section, and thereafter conveying said recording sheet to said automatic developing section.

Also, the radiation image read-out and reproducing apparatus in accordance with the present invention may be constituted so that the recording sheet carrying the radiation image reproduced thereon is temporarily housed in a housing means before being sent to the automatic developing machine outside of the radiation image read-out and reproducing apparatus. Accordingly, the present invention also provides a third radiation image read-out and reproducing apparatus comprising the aforesaid stimulable phosphor sheet feeding section, the aforesaid film feeding section, the aforesaid recording sheet feeding section, the aforesaid light beam scanning section, the aforesaid stimulable phosphor sheet conveyance means, the aforesaid film conveyance means, a recording sheet housing section for housing said recording sheet on which image reproduction has been finished at said light beam scanning section, and a recording sheet conveyance means for receiving said recording sheet fed out of said recording sheet feeding section, conveying said recording sheet to said light beam scanning section, and thereafter conveying said recording sheet to said recording sheet housing section. The read-out main scanning means for the stimulable phosphor sheet, the read-out main scanning means for the film, and the reproducing main scanning means may be common to one another in whole or in part.

With the first to third radiation image read-out and reproducing apparatuses in accordance with the present invention wherein a read-out apparatus and a reproducing apparatus which have heretofore been provided independently of each other are combined integrally with each other by carrying out both the image read-out and the reproduction by use of the same sub-scanning system, and the read-out of the image recorded on the film can be carried out by use of the same sub-scanning means, the overall system including the function of the image read-out from the film can be made small, and the manufacture cost of the overall system can be reduced.

Also, the light deflector and the light source of the main scanning means can be utilized commonly to the image read-out and the reproduction, and the stimulable phosphor sheet conveyance means, the film conveyance means and the recording sheet conveyance means can be partially utilized in common. Therefore, the overall system can be made smaller and the cost thereof can be made lower.

DESCRIPTION OF THE PREFERRED EMBODIMENTS

The present invention will hereinbelow be described in further detail with reference to the accompanying drawings.

Figure 1:
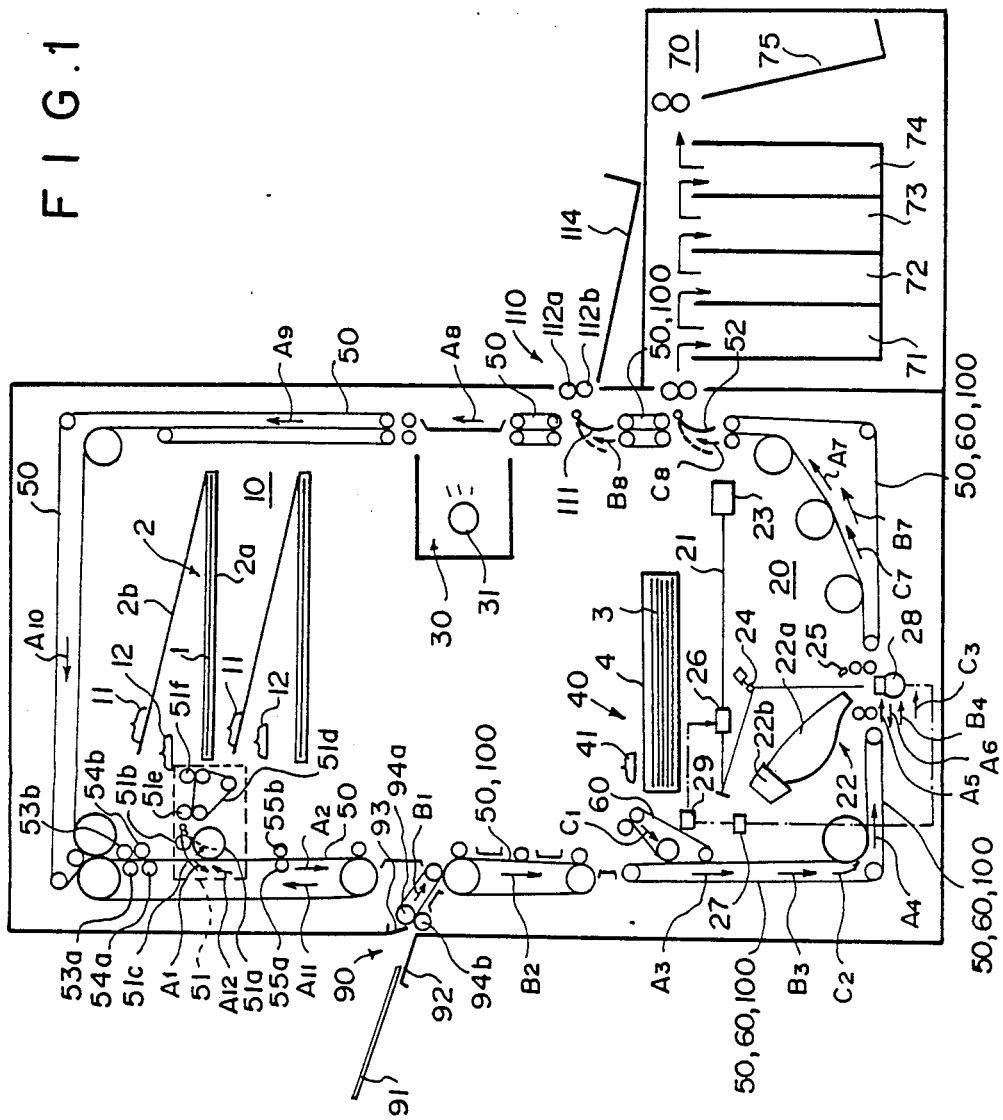
FIG. 1 is a schematic side view showing an embodiment of the radiation image read-out and reproducing apparatus in accordance with the present invention.

With reference to FIG. 1, an embodiment of the radiation image read-out and reproducing apparatus in accordance with the present invention is provided with a stimulable phosphor sheet feeding section 10 for releasably holding a plurality of cassettes 2, 2, . . . each capable of housing a stimulable phosphor sheet 1 therein, a film feeding section 90 capable of feeding a developed film 91 into the apparatus by feeding the film 91 onto a guide plate 92 and inserting it between the guide plate 92 and a light shielding plate 93, a recording sheet feeding section 40 for releasably holding a recording sheet feeding magazine 4 capable of housing a plurality of recording sheets 3, 3, . . . therein, a light beam scanning section 20 for reading out a radiation image stored on the stimulable phosphor sheet 1 or the film 91 by the scanning of the stimulable phosphor sheet 1 or the film 91 and reproducing the radiation image thus read out on the recording sheet 3, an erasing section 30 for erasing radiation energy remaining on the stimulable phosphor sheet 1 after image read-out therefrom is finished at the light beam scanning section 20, and an automatic developing section 70 for carrying out development for the recording sheet 3 on which the radiation image has been reproduced at the light beam scanning section 20.

The region inside of the apparatus is shielded from light so that the stimulable phosphor sheet 1 and the recording sheet 3 are not exposed to external light.

This embodiment will first be described below for the case where the radiation image stored on the stimulable phosphor sheet 1 is be read out.

The stimulable phosphor sheet 1 has been subjected to image recording in an external image recording apparatus (not shown) in the form housed in the cassette 2, and the cassette 2 housing the image-recorded stimulable phosphor sheet 1 is fed to the stimulable phosphor sheet feeding section 10. In this embodiment, by way of example, two cassettes 2, 2 can be held at the stimulable phosphor sheet feeding section 10. Each of the cassettes 2, 2, . . . is light-tight so that the stimulable phosphor sheet 1 is prevented from exposure to external light when it is exposed to a radiation to have a radiation image recorded thereon. The cassette 2 comprises a cassette body 2a in which the stimulable phosphor sheet 1 is to be housed and an openable cover member 2b. When the cassette 2 is fed into the stimulable phosphor sheet feeding section 10, the cover member 2b is maintained in the closed position. When the stimulable phosphor sheet 1 is to be taken out of the cassette 2 at the stimulable phosphor sheet feeding section 10, the cover member 2b is opened as shown in FIG. 1 by a cover opening means 11 constituted by a suction cup or the like.

At the stimulable phosphor sheet feeding section 10, the two cassettes 2, 2 are held one above the other in parallel relation to each other, and taking-out of the stimulable phosphor sheet 1 is carried out from each of the cassettes 2, 2. Taking-out and conveyance of the stimulable phosphor sheet 1 will hereinbelow be described by taking the upper cassette 2 between the two cassettes 2, 2 held at the stimulable phosphor sheet feeding section 10 as an example.

Figure 2:
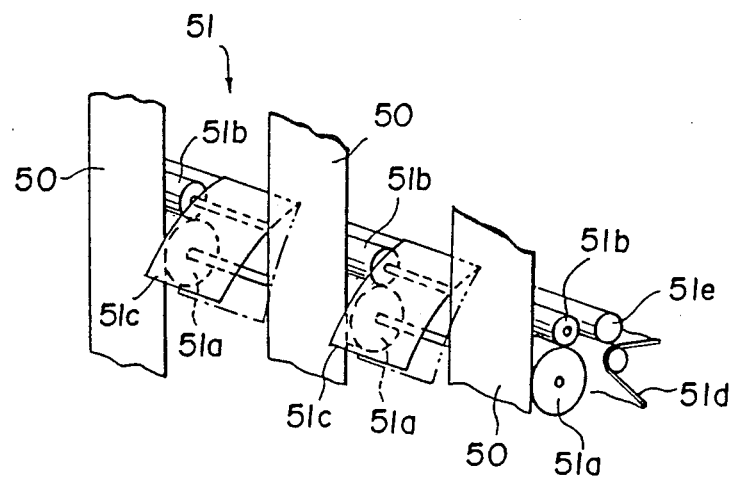
FIG. 2 is an enlarged perspective view showing a part of the moveable conveyance section.

The embodiment shown in FIG. 1 is provided with a stimulable phosphor sheet conveyance means 50 comprising endless belts, rollers, guide plates or the like for taking the stimulable phosphor sheet 1 out of an arbitrary cassette 2 at the stimulable phosphor sheet feeding section 10, and conveying the stimulable phosphor sheet 1 to the light beam scanning section 20 and the erasing section 30 in this order. A moveable conveyance section 51 is disposed at a part of the stimulable phosphor sheet conveyance means 50 for vertical movement to selectively face an end portion of an arbitrary one of the cassettes 2, 2 held at the stimulable phosphor sheet feeding section 10. FIG. 2 shows a part of the moveable conveyance section 51. When the stimulable phosphor sheet 1 is to be taken out of the upper cassette 2 at the stimulable phosphor sheet feeding section 10, the moveable conveyance section 51 is moved to its upper position as shown in FIG. 1 to face the upper cassette 2.

A suction means 12 advances into the cassette 2 whose cover member 2b has been opened, and sucks and takes the stimulable phosphor sheet 1 out of the cassette 2. The suction means 12 then transfers the stimulable phosphor sheet 1 to a belt conveyor 51d and a roller 51f of the moveable conveyance section 51, and the stimulable phosphor sheet 1 is then grasped between the belt conveyor 51d and a roller 51e. The stimulable phosphor sheet 1 has been housed in the cassette 2 with its front surface provided with a stimulable phosphor layer facing down. The stimulable phosphor sheet 1 taken out of the cassette 2 in this manner is conveyed by rollers 51a and 51b in the direction as indicated by the arrow A1 with a moveable guide plate 51c of the moveable conveyance section 51 positioned as indicated by the solid line, and then conveyed by the stimulable phosphor sheet conveyance means 50 in the directions as indicated by the arrows A2, A3 and A4 to the light beam scanning section 20.

As for the stimulable phosphor sheet 1, the light beam scanning section 20 is operated for scanning the stimulable phosphor sheet 1 carrying a radiation image stored thereon by a laser beam 21 as stimulating rays which cause the stimulable phosphor sheet 1 to emit light in proportion to the stored radiation energy, and photoelectrically detecting the emitted light by an emitted light detection means 22 constituted by a photomultiplier or the like to obtain electric image signals for use in reproduction of a visible image. Reference numeral 23 denotes a He-Ne laser beam source, and reference numeral 24 denotes a light deflector such as a galvanometer mirror. Reference numeral 25 designates a reflection mirror for reflecting the light emitted by the stimulable phosphor sheet 1 towards a light guide member 22a of the photoelectric read-out means 22. The light guide member 22a guides the light through total reflection therein up to a photodetector 22b constituted by a photomultiplier or the like. A light modulator 26 constituted by an acousto-optic modulator (AOM) or the like is not activated when the laser beam 21 scans the stimulable phosphor sheet 1.

The stimulable phosphor sheet 1 sent to the light beam scanning section 20 is conveyed by the stimulable phosphor sheet conveyance means 50 in the direction as indicated by the arrow A5, and the overall surface of the stimulable phosphor sheet 1 is scanned two-dimensionally by the laser beam 21 deflected approximately normal to the conveyance direction. The light emitted by the stimulable phosphor sheet 1 in the course of the scanning is detected by the photodetector 22b via the light guide member 22a. The photodetector 22b converts the detected light into electric signals, which are then sent to an image processing circuit 27 for carrying out image processing on the electric signals, and stored in a memory 29. In this embodiment, the part of the stimulable phosphor sheet conveyance means 50 inside of the light beam scanning section 20 constitutes the sub-scanning means.

As for the radiation image read-out, there has heretofore been known a method wherein preliminary read-out for approximately ascertaining the radiation image stored on the stimulable phosphor sheet 1 is carried out prior to the aforesaid image read-out (final read-out) for obtaining electric image signals for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary read-out may be conducted by scanning the stimulable phosphor sheet 1 with stimulating rays having stimulation energy of a level lower than the level of the stimulation energy of the laser beam (stimulating rays) used in the final read-out, and detecting the light emitted by the stimulable phosphor sheet 1 in the course of the scanning by a photoelectric read-out means.

The light beam scanning section 20 may be constituted to carry out only the final read-out or both the preliminary read-out and the final read-out. For example, the preliminary read-out may be carried out by conveying the stimulable phosphor sheet 1 in the direction as indicated by the arrow A5, the stimulable phosphor sheet 1 may then be switched back and reversely conveyed in the direction as indicated by the arrow A6 to the read-out start position, and then the final read-out may be carried out while the stimulable phosphor sheet 1 is again conveyed in the direction as indicated by the arrow A5. The optical members at the light beam scanning section 20 are not limited to those as mentioned above. For example, as proposed in Japanese Patent Application No. 60(1985)-156255, a long photomultiplier may be disposed along the main scanning line as the emitted light detection means for detecting the light emitted by the stimulable phosphor sheet 1. After image read-out from the stimulable phosphor sheet 1 is finished at the light beam scanning section 20, the stimulable phosphor sheet 1 is conveyed by the stimulable phosphor sheet conveyance means 50 in the direction as indicated by the arrow A7 to the erasing section 30. A first distribution means 52 and a second distribution means 111 are disposed between the light beam scanning section 20 and the erasing section 30. At the time the stimulable phosphor sheet 1 is thus conveyed, the first distribution means 52 and the second distribution means 111 are maintained at the positions as indicated by the solid lines in FIG. 1 and guide the stimulable phosphor sheet 1 to the erasing section 30.

At the erasing section 30, radiation energy remaining on the stimulable phosphor sheet 1 after the image read-out therefrom is finished is erased. Specifically, a part of the radiation energy stored on the stimulable phosphor sheet 1 at the image recording step remains stored thereon after the image read-out is carried out. In order to reuse the stimulable phosphor sheet 1, the residual radiation energy is erased at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the stimulable phosphor sheet 1 is exposed to the erasing light emitted by the erasing light sources 31, 31, . . . for releasing the residual radiation energy from the stimulable phosphor sheet 1 while the stimulable phosphor sheet 1 is conveyed in the direction as indicated by the arrow A8. At the erasing section 30, any known erasing method may be used. For example, erasing may be conducted by heating or by a combination of exposure to the erasing light with heating.

After erasing of the stimulable phosphor sheet 1 is finished at the erasing section 30, the stimulable phosphor sheet 1 is conveyed by the stimulable phosphor sheet conveyance means 50 in the directions as indicated by the arrows A9 and A10. Then, the stimulable phosphor sheet 1 is conveyed in the direction as indicated by the arrow A2 and passes through the moveable conveyance section 51 with the moveable guide plate 51c of the moveable conveyance section 52 moved to the position as indicated by the broken line. The moveable guide plate 51c is then moved to the position as indicated by the solid line, and the stimulable phosphor sheet 1 is switched back in the direction as indicated by the arrow A11, guided by the moveable guide plate 51c, grasped between the rollers 51a and 51b, and conveyed in the direction as indicated by the arrow A12. The stimulable phosphor sheet 1 is then conveyed by the belt conveyor 51d and rollers 51e and 51f into the empty upper cassette 2 at the stimulable phosphor sheet feeding section 10.

The case wherein the radiation image is read out of the developed film 91 will be described hereinbelow.

The developed film 91 carrying the radiation image recorded and developed thereon by an external recording apparatus (not shown) and an external developing apparatus (not shown) is fed from the film feeding section 90 into the radiation image read-out and reproducing apparatus. This embodiment is constituted so that the films 91, 91, . . . are fed one after another from the exterior of the apparatus. However, for example, as in the case of the recording sheet feeding magazine 4 and the recording sheet feeding section 40, a plurality of the films 91, 91, . . . may be housed in a magazine, the magazine may be fed into the apparatus, and the films 91, 91, . . . may be taken one after another from the magazine.

The film 91 inserted from the film feeding section 90 passes between rollers 94a and 94b, and is conveyed by a film conveyance means 100 in the directions as indicated by the arrows B1, B2 and B3 into the light beam scanning section 20.

The film 91 sent to the light beam scanning section 20 is conveyed by the film conveyance means 100 in the direction as indicated by the arrow B4. The overall surface of the film 91 is two-dimensionally scanned by the laser beam 21 deflected approximately normal to the direction of conveyance of the film 91, and the laser beam 21 intensity-modulated by the radiation image recorded on the film 91 is photoelectrically detected to obtain image signals by a light beam detection means 28 composed of a long photomultiplier or the like.

The light beam detection means 28 should be constituted by an optical member having a sensitivity to the wavelength within the wavelength range of the laser beam 21, and may be composed of a combination of a light guide member with a photomultiplier as in the case of the emitted light detection means 22, instead of the long photomultiplier.

At the time the film 91 is scanned by the laser beam 21, the operation of the light modulator 26 is stopped as in the case where the stimulable phosphor sheet 1 is scanned. The image signals obtained by the light beam detection means 28 are sent to the image processing circuit 27 and subjected to image processing. At the light beam scanning section 20, the film conveyance means 100 is common to the stimulable phosphor sheet conveyance means 50, and the common part of the conveyance means constitutes the subscanning means.

After the image read-out from the film 91 is finished at the light beam scanning section 20, the film 91 is conveyed by the film conveyance means 100 in the directions as indicated by the arrows B7 and B8 toward a film discharging section 110. The first distribution means 52 and the second distribution means 111 are provided at this part of the conveyance means. At the time the film 91 is conveyed, the first distribution means 52 is maintained at the position as indicated by the solid line, and the second distribution means 111 is moved to the position as indicated by the broken line, thereby to guide the film 91 between rollers 112a and 112b. The film 91 passes between the rollers 112a and 112b, is discharged from the apparatus, and is housed in a tray 114.

The image reproduction on the recording sheet 3 by use of the image signals detected from the stimulable phosphor sheet 1 or the film 91 in the manner as mentioned above will be described hereinbelow.

A single recording sheet 3 is taken by a suction means 41 out of the magazine 4 at the recording sheet feeding section 40, and transferred to a neighboring recording sheet conveyance means 60. The recording sheet conveyance means 60 receives and conveys the recording sheet 3 to the light beam scanning section 20, and conveys the recording sheet 3 passing through the light beam scanning section 20 to the automatic developing section 70. A part of the recording sheet conveyance means 60 is common with the stimulable phosphor sheet conveyance means 50 and the film conveyance means 100. The recording sheet 3 is conveyed by the recording sheet conveyance means 60 in the directions as indicated by the arrows C1 and C2 into the light beam scanning section 20, and the radiation image read from the stimulable phosphor sheet 1 or the film 91 in the manner as mentioned above is recorded on the recording sheet 3 while the recording sheet 3 is being conveyed in the direction as indicated by the arrow C3 in the light beam scanning section 20.

At the time the recording sheet 3 is thus conveyed, the light modulator 26 at the light beam scanning section 20 is operated in accordance with the image signals which were detected from the stimulable phosphor sheet 1 or the film 91 and processed and stored in the memory 29, and the operations of the emitted light detection means 22 and the light beam detection means 28 are stopped. The recording sheet 3 is scanned by the laser beam 21 now acting as the recording light modulated by the light modulator 26 and deflected by the light deflector 24, so that the radiation image which was stored on the stimulable phosphor sheet 1 or the film 91 is reproduced over the overall surface of the recording sheet 3.

After the image reproduction on the recording sheet 3 is finished at the light beam scanning section 20, the recording sheet 3 is conveyed by the recording sheet conveyance means 60 in the directions as indicated by the arrows C7 and C8 into the automatic developing section 70. At this time, the first distribution means 52 is rotated to the position as indicated by the broken line in FIG. 1, and guides the recording sheet 3 to the automatic developing section 70.

At the automatic developing section 70, the recording sheet 3 is subjected to development processing by being sent sequentially through a developing zone 71, a fixing zone 72, a washing zone 73 and a drying zone 74, and is then housed in a tray 75.

With the aforesaid embodiment wherein the image read-out from the stimulable phosphor sheet 1, the image read-out from the film 91 and the image reproduction on the recording sheet 3 are carried out by commonly utilizing the main scanning means and the sub-scanning means at the light beam scanning section 20, the overall system including the function of the image read-out from the film 91 can be made small and the manufacture cost can be made low. Also, with the aforesaid embodiment wherein the stimulable phosphor sheet feeding section 10 is constituted to hold a plurality of the cassettes 2, 2, . . . , the cassettes 2, 2, . . . each housing an image-recorded stimulable phosphor sheet 1 can sequentially be loaded to the stimulable phosphor sheet feeding section 10 and made to wait for processing even at the time the image read-out or the image reproduction is being carried out at the light beam scanning section 20.

The moveable conveyance section 51 of the stimulable phosphor sheet conveyance means 50 moves vertically to face an arbitrary cassette 2 at the stimulable phosphor sheet feeding section 50. As the moveable conveyance section 51 moves, rollers 53a, 53b, 54a and 54b above the moveable conveyance section 51 and rollers 55a and 55b below the moveable conveyance section 51 are also moved vertically, so that the interval between the adjacent roller pairs is always maintained smaller than the length of the stimulable phosphor sheet 1. Also, in the aforesaid embodiment, reproduction of the radiation image read out from a single stimulable phosphor sheet 1 or a single film 91 is carried out on a single recording sheet 3 immediately after the image read-out is carried out on the stimulable phosphor sheet 1 or the film 91. Instead, the capacity of the memory 29 may be increased, the image read-out may be carried out continuously for a plurality of the stimulable phosphor sheets at the light beam scanning section 20, image signals thus detected may be stored in the memory 29, and then the image reproduction may be carried out continuously on a plurality of the recording sheets. Also, instead of reproducing all of the read-out radiation images as hard copies on the recording sheets, the radiation images may be displayed on a display device such as a CRT, and only the necessary images may be reproduced as hard copies on the recording sheets.

As mentioned above, the stimulable phosphor sheet 1 and the film 91 are first subjected to the image recording in an external image recording apparatus. In the course of reproduction of the radiation image read out from the stimulable phosphor sheet 1, it is necessary to display the sex, name, date of image recording, image recording portion, and other items of information inherent to the object together with the radiation image. Accordingly, the ID information has heretofore been input to an ID card or the like by use of a special ID input means such as an ID terminal. The input information is transmitted to a reproducing apparatus at the time of reproduction of the radiation image, and is displayed on a reproduction surface together with the radiation image. However, in this case, since the special input means is necessary, the system as a whole becomes complicated, and the input operation is troublesome. Since the apparatus of the present invention aims at simplification of the system as a whole, the ID information should preferably be read and displayed on the reproduction surface without using a complicated, large-scale device such as the ID terminal. For this purpose, for example, an image recording instruction sheet usually compiled for each object at the time of image recording may be utilized, the radiation image read-out and reproducing apparatus may be provided with a pickup tube or a solid state image pickup device for reading the ID information on the object written on the image recording instruction sheet, and the ID information may be detected as image signals by use of the read means. The image signals may be stored, and then used for reproduction on the recording sheet together with the radiation image read out independently.

Figure 3:
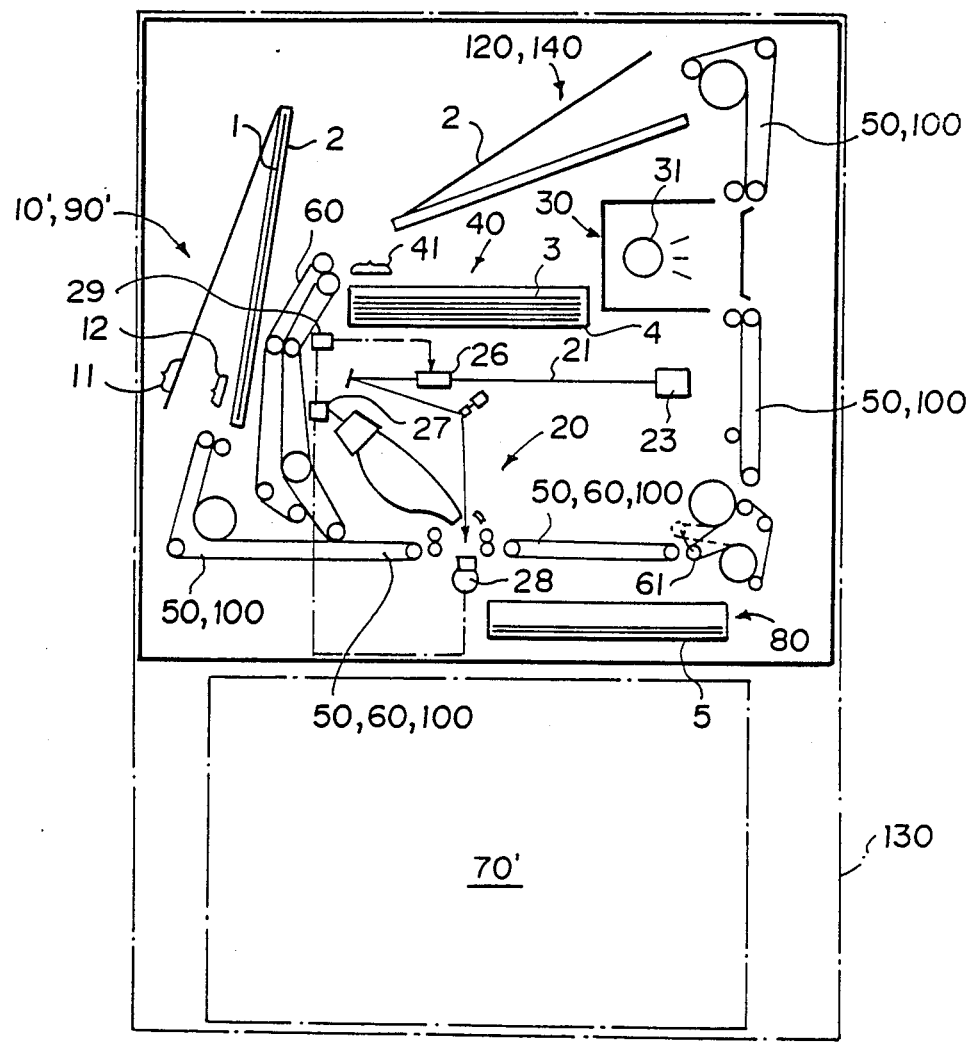
FIG. 3 is a schematic side view showing another embodiment of the radiation image read-out and reproducing apparatus in accordance with the present invention.

Another embodiment of the radiation image read-out and reproducing apparatus in accordance with the present invention will hereinbelow be described with reference to FIG. 3. In FIG. 3, similar elements are numbered with the same reference numerals with respect to FIG. 1.

With reference to FIG. 3, a stimulable phosphor sheet feeding section 10' is constituted to hold only a single cassette 2. When the stimulable phosphor sheet 1 is taken out of the cassette 2 at the stimulable phosphor sheet feeding section 10', the cassette 2 is loaded in the empty condition to a stimulable phosphor sheet housing section 120. The stimulable phosphor sheet 1 taken out of the cassette 2 is conveyed by the stimulable phosphor sheet conveyance means 50 to the light beam scanning section 20 and then to the erasing section 30, and image read-out and erasing are carried out. After the erasing is finished, the erased reusable stimulable phosphor sheet 1 is conveyed by the stimulable phosphor sheet conveyance means 50 into the cassette 2 waiting in the empty condition at the stimulable phosphor sheet housing section 120, and taken out of the apparatus for reuse in image recording.

The cassette 2 is utilized also for housing the developed film 91, the stimulable phosphor sheet feeding section 10' is utilized also as a film feeding section 90', and the stimulable phosphor sheet housing section 120 is utilized also as a film housing section 140. As in the case of the image read-out from the stimulable phosphor sheet 1, when the film 91 is taken out of the cassette 2 at the film feeding section 90', the cassette 2 in the empty condition is immediately fitted to the film housing section 140. The film 91 taken out of the cassette 2 is conveyed by the film conveyance means common with the stimulable phosphor sheet conveyance means 50 to the light beam scanning section 20, and is subjected to the image read-out. After the image read-out from the film 91 is finished, the film 91 is conveyed by the film conveyance means 100 into the cassette 2 waiting in the empty condition at the film housing section 140, and is taken out of the apparatus. At the time the conveyance, image read-out and housing of the film 91 are carried out, the erasing light sources 31, 31, ... at the erasing section 30 need not be activated, and therefore are turned off.

A single recording sheet 3 is taken out of the magazine 4 at the recording sheet feeding section 40 each time the image read-out from the stimulable phosphor sheet 1 or the film 91 is finished at the light beam scanning section 20, and conveyed by the recording sheet conveyance means 60 to the light beam scanning section 20. The radiation image read out from the stimulable phosphor sheet 1 or the film 91 at the light beam scanning section 20 is reproduced on the recording sheet 3, and the recording sheet 3 is then conveyed to a recording sheet housing section 80 at which a recording sheet housing magazine 5 is held releasably. Specifically, a roller 61 at a part of the recording sheet conveyance means 60 is moved between the position as indicated by the solid line and the position as indicated by the broken line, thereby to change over the conveyance path for the stimulable phosphor sheet 1 and the film 91 and the conveyance path for the recording sheet 3. At the time the stimulable phosphor sheet 1 or the film 91 is conveyed out of the light beam scanning section 20, the roller 61 is moved to the position as indicated by the solid line and guides the stimulable phosphor sheet 1 or the film 91 toward the erasing section 30. At the time the recording sheet 3 is conveyed out of the light beam scanning section 20, the roller 61 is moved to the position as indicated by the broken line and guides the recording sheet 3 to the recording sheet housing section 80. The recording sheet housing magazine 5 in which the image-reproduced recording sheet 3 is housed is conveyed to an external automatic developing machine when necessary.

Also in the embodiment shown in FIG. 3 instead of providing the recording sheet housing section 80, an automatic developing section 70' may be provided, and the recording sheet 3 conveyed out of the light beam scanning section 20 may be conveyed directly to the automatic developing section 70'. In this case, the automatic developing section 70' should preferably be disposed below the light beam scanning section 20 for decreasing the installation space for the whole apparatus. Also, though the automatic developing section may be formed integrally with the other sections or may be formed independently thereof via the recording sheet conveyance means, the automatic developing section should preferably be built integrally in the same case 130 as the other sections for the purpose of facilitating temperature control or the like. The cassette loaded to the stimulable phosphor sheet housing section 120 need not necessarily be the one that was taken out of the stimulable phosphor sheet feeding section 10', and a different empty cassette may be loaded to the stimulable phosphor sheet housing section 120. Furthermore, the cassette need not necessarily be loaded to the stimulable phosphor sheet feeding section 10' and the sheet housing section 120, and a magazine, a tray or the like capable of housing a plurality of the stimulable phosphor sheets may be loaded thereto. In the case where the tray is used at the sheet housing section 120, the erasing section 30 need not necessarily be provided. Instead, the tray in which the stimulable phosphor sheets are housed may be taken out of the apparatus, and the stimulable phosphor sheets may be subjected to the erasing outside of the apparatus. Moreover, in the aforesaid embodiments, the layout and the configurations of the stimulable phosphor sheet feeding section, the film feeding section, the recording sheet feeding section, the light beam scanning section and the erasing section are not limited to the ones as mentioned above. For example, at the light beam scanning section, it is only necessary that at least the sub-scanning means be utilized commonly to the stimulable phosphor sheet, the film and the recording sheet. The read-out main scanning means for the stimulable phosphor sheet, the read-out main scanning means for the film, and the reproducing main scanning means may be provided independently of one another. Also, in the read-out main scanning means and the reproducing main scanning means, a single light deflector may be utilized in common, the read-out light source and the reproduction light source may be provided independently of each other, and the light beam for read-out and the light beam for reproduction may be changed over by use of a mirror or the like.

The recording sheet may be a silver halide photographic film, a heat development photosensitive material, an instant film, a heat-sensitive recording sheet, or the like. In this case, the configuration of the developing section is adapted to the recording sheet used.

We claim:

1. A radiation image read-out and reproducing apparatus comprising:
   (i) a stimulable phosphor sheet feeding section for housing a stimulable phosphor sheet carrying a radiation image stored thereon, and feeding out the housed stimulable phosphor sheet,
   (ii) a film feeding section for feeding a developed film carrying a radiation image recorded thereon,
   (iii) a recording sheet feeding section for housing recording sheets and feeding out the housed recording sheets one by one,
   (iv) a light beam scanning section provided with:
      (a) a read-out main scanning means for the stimulable phosphor sheet for deflecting a light beam by a light deflector and scanning said light beam in a main scanning direction on said stimulable phosphor sheet,
      (b) a read-out main scanning means for the film for deflecting a light beam by a light deflector and scanning said light beam in a main scanning direction on said film,
      (c) a reproducing main scanning means for deflecting a light beam by a light deflector and scanning said light beam in the main scanning direction on said recording sheet,
      (d) a sub-scanning means for scanning said stimulable phosphor sheet, said film and said recording sheet respectively in a sub-scanning direction by moving them in the sub-scanning direction approximately normal to said main scanning direction,
      (e) an emitted light detection means for detecting light which is emitted by a position on said stimulable phosphor sheet upon which the light beam is irradiated by said read-out main scanning means for the stimulable phosphor sheet and which carries the radiation image stored on said stimulable phosphor sheet, and
      (f) a light beam detection means for detecting the light beam irradiated by said read-out main scanning means for the film onto said film and intensity-modulated by the radiation image recorded on said film,
      wherein the radiation image is detected by said emitted light detection means or said light beam detection means by scanning said stimulable phosphor sheet or said film, and said radiation image thus detected is reproduced on said recording sheet by modulating the light beam in said reproducing main scanning means in accordance with said detected radiation image,
   (v) a stimulable phosphor sheet conveyance means for receiving said stimulable phosphor sheet fed out of said stimulable phosphor sheet feeding section, conveying said stimulable phosphor sheet to said light beam scanning section, and thereafter conveying said stimulable phosphor sheet out of said light beam scanning section,
   (vi) a film conveyance means for receiving said developed film fed out of said film feeding section, conveying said developed film to said light beam scanning section, and thereafter conveying said developed film out of said light beam scanning section, and
   (vii) a recording sheet conveyance means for receiving said recording sheet fed out of said recording sheet feeding section, conveying said recording sheet to said light beam scanning section, and thereafter conveying said recording sheet out of said light beam scanning section.

2. An apparatus as defined in claim 1 wherein said light deflector of said read-out main scanning means for the stimulable phosphor sheet, said light deflector of said read-out main scanning means for the film, and said light deflector of said reproducing main scanning means are common to one another.

3. An apparatus as defined in claim 2 wherein a light source for said light beam of said read-out main scanning means for the stimulable phosphor sheet, a light source for said light beam of said read-out main scanning means for the film, and a light source for said light beam of said reproducing main scanning means are common to one another.

4. An apparatus as defined in claim 1 wherein at least a part of said stimulable phosphor sheet conveyance means, at least a part of said film conveyance means, and at least a part of said recording sheet conveyance means are common to one another.

5. A radiation image read-out and reproducing apparatus comprising:
   (i) a stimulable phosphor sheet feeding section for housing a stimulable phosphor sheet carrying a radiation image stored thereon, and feeding out the housed stimulable phosphor sheet,
   (ii) a film feeding section for feeding a developed film carrying a radiation image recorded thereon,
   (iii) a recording sheet feeding section for housing recording sheets and feeding out the housed recording sheets one by one,
   (iv) a light beam scanning section provided with:
      (a) a read-out main scanning means for the stimulable phosphor sheet for deflecting a light beam by a light deflector and scanning said light beam in a main scanning direction on said stimulable phosphor sheet,
      (b) a read-out main scanning means for the film for deflecting a light beam by a light deflector and scanning said light beam in a main scanning direction on said film,
      (c) a reproducing main scanning means for deflecting a light beam by a light deflector and scanning said light beam in the main scanning direction on said recording sheet,
      (d) a sub-scanning means for scanning said stimulable phosphor sheet, said film and said recording sheet respectively in a sub-scanning direction by moving them in the sub-scanning direction approximately normal to said main scanning direction,
      (e) an emitted light detection means for detecting light which is emitted by a position on said stimulable phosphor sheet upon which the light beam is irradiated by said read-out main scanning means for the stimulable phosphor sheet and which carries the radiation image stored on said stimulable phosphor sheet, and (f) a light beam detection means for detecting the light beam irradiated by said read-out main scanning means for the film onto said film and intensity-modulated by the radiation image recorded on said film, wherein the radiation image is detected by said emitted light detection means or said light beam detection means by scanning said stimulable phosphor sheet or said film, and said radiation image thus detected is reproduced on said recording sheet by modulating the light beam in said reproducing main scanning means in accordance with said detected radiation image, (v) an automatic developing section for carrying out development on said recording sheet carrying said radiation image reproduced thereon, (vi) a stimulable phosphor sheet conveyance means for receiving said stimulable phosphor sheet fed out of said stimulable phosphor sheet feeding section, conveying said stimulable phosphor sheet to said light beam scanning section, and thereafter conveying said stimulable phosphor sheet out of said light beam scanning section, (vii) a film conveyance means for receiving said developed film fed out of said film feeding section, conveying said developed film to said light beam scanning section, and thereafter conveying said developed film out of said light beam scanning section, and (viii) a recording sheet conveyance means for receiving said recording sheet fed out of said recording sheet feeding section, conveying said recording sheet to said light beam scanning section, and thereafter conveying said recording sheet to said automatic developing section.

6. An apparatus as defined in claim 5 wherein said light beam scanning section and said automatic developing section are provided integrally with each other in the same case.

7. An apparatus as defined in claim 5 wherein said light deflector of said read-out main scanning means for the stimulable phosphor sheet, said light deflector of said read-out main scanning means for the film, and said light deflector of said reproducing main scanning means are common to one another.

8. An apparatus as defined in claim 7 wherein a light source for said light beam of said read-out main scanning means for the stimulable phosphor sheet, a light source for said light beam of said read-out main scanning means for the film, and a light source for said light beam of said reproducing main scanning means are common to one another.

9. An apparatus as defined in claim 5 wherein at least a part of said stimulable phosphor sheet conveyance means, at least a part of said film conveyance means, and at least a part of said recording sheet conveyance means are common to one another.

10. A radiation image read-out and reproducing apparatus comprising:

(i) a stimulable phosphor sheet feeding section for housing a stimulable phosphor sheet carrying a radiation image stored thereon, and feeding out the housed stimulable phosphor sheet, (ii) a film feeding section for feeding a developed film carrying a radiation image recorded thereon, (iii) a recording sheet feeding section for housing recording sheets and feeding out the housed recording sheets one by one, (iv) a light beam scanning section provided with:

(a) a read-out main scanning means for the stimulable phosphor sheet for deflecting a light beam by a light deflector and scanning said light beam in a main scanning direction on said stimulable phosphor sheet, (b) a read-out main scanning means for the film for deflecting a light beam by a light deflector and scanning said light beam in a main scanning direction on said film, (c) a reproducing main scanning means for deflecting a light beam by a light deflector and scanning said light beam in the main scanning direction on said recording sheet, (d) a sub-scanning means for scanning said stimulable phosphor sheet, said film and said recording sheet respectively in a sub-scanning direction by moving them in the sub-scanning direction approximately normal to said main scanning direction, (e) an emitted light detection means for detecting light which is emitted by a position on said stimulable phosphor sheet upon which the light beam is irradiated by said read-out main scanning means for the stimulable phosphor sheet and which carries the radiation image stored on said stimulable phosphor sheet, and (f) a light beam detection means for detecting the light beam irradiated by said read-out main scanning means for the film onto said film and intensity-modulated by the radiation image recorded on said film, wherein the radiation image is detected by said emitted light detection means or said light beam detection means by scanning said stimulable phosphor sheet or said film, and said radiation image thus detected is reproduced on said recording sheet by modulating the light beam in said reproducing main scanning means in accordance with said detected radiation image, (v) a recording sheet housing section for housing said recording sheet on which image reproduction has been finished at said light beam scanning section, (vi) a stimulable phosphor sheet conveyance means for receiving said stimulable phosphor sheet fed out of said stimulable phosphor sheet feeding section, conveying said stimulable phosphor sheet to said light beam scanning section, and thereafter conveying said stimulable phosphor sheet out of said light beam scanning section, (vii) a film conveyance means for receiving said developed film fed out of said film feeding section, conveying said developed film to said light beam scanning section, and thereafter conveying said developed film out of said light beam scanning section, and (viii) a recording sheet conveyance means for receiving said recording sheet fed out of said recording sheet feeding section, conveying said recording sheet to said light beam scanning section, and thereafter conveying said recording sheet to said recording sheet housing section.

11. An apparatus as defined in claim 10 wherein said light deflector of said read-out main scanning means for the stimulable phosphor sheet, said light deflector of said read-out main scanning means for the film, and said light deflector of said reproducing main scanning means are common to one another.

12. An apparatus as defined in claim 11 wherein a light source for said light beam of said read-out main scanning means for the stimulable phosphor sheet, a light source for said light beam of said read-out main scanning means for the film, and a light source for said light beam of said reproducing main scanning means are common to one another.

13. An apparatus as defined in claim 10 wherein at least a part of said stimulable phosphor sheet conveyance means, at least a part of said film conveyance means, and at least a part of said recording sheet conveyance means are common to one another.

* * * * *